(12) United States Patent
Nakagawa

(10) Patent No.: US 6,518,966 B1
(45) Date of Patent: Feb. 11, 2003

(54) METHOD AND DEVICE FOR COLLISION DETECTION AND RECORDING MEDIUM RECORDED WITH COLLISION DETECTION METHOD

(75) Inventor: Masamichi Nakagawa, Hirakata (JP)

(73) Assignee: Matsushita Institute Industrial Co., Ltd., Osaka (JP)

( * ) Notice: Subject to any disclaimer, the term of this patent is extended or adjusted under 35 U.S.C. 154(b) by 0 days.

(21) Appl. No.: 09/266,630

(22) Filed: Mar. 11, 1999

(30) Foreign Application Priority Data

Mar. 11, 1998 (JP) .......................................... 10-060047

(51) Int. Cl.[7] .............................................. G06T 15/40
(52) U.S. Cl. ...................................................... 345/422
(58) Field of Search ................................ 345/421, 422, 345/619

(56) References Cited

U.S. PATENT DOCUMENTS

| | | | | |
|---|---|---|---|---|
| 4,766,556 A | * | 8/1988 | Arakawa ..................... | 364/522 |
| 5,579,455 A | * | 11/1996 | Greene et al. .............. | 345/419 |
| 5,914,721 A | * | 6/1999 | Lim ........................... | 345/421 |
| 6,069,633 A | * | 5/2000 | Apparao et al. ............ | 345/421 |

OTHER PUBLICATIONS

Foley et al., "Computer Graphics: Principles and Practice" Sec. Ed, ISBN 0–201–12110–7, 1992, pp. 712–713.*
"A Simple and Efficient Method for Accurate Collision Detection Among Deformable Polyhedral Objects in Motion" by Smith A.; Kitamura, Y.; Takemura, H.; Kishino, F. Virtual Reality Annuyal International Symposium, 1995 Proceedings, pp.: 136–145.*

"Solving the Collision Detection Problem" by Garcia–Alonso, A.; Serrano, N.; Flaquer, J. IEEE Computer Graphics and Applications, vol.: 14 Issue; 3, May 1994, pp.; 36–43.*

"Interference Detection Through Rasterization", by M. Shinya, et al., The Journal of Visualization and Computer Animation, vol. 2, pp. 132–134 (1991).

Hansong zhang et al., Visibility Culling using Hierarchical Occlusion Maps in Computer Graphics Proceedings, Annual Conference Series, 1997, pp77–88.

Takeo Kanade et al., Video–Rate Z Keying: A New Method for Merging Images, Dec. 1995, pp7–16.

* cited by examiner

*Primary Examiner*—Mark Zimmerman
*Assistant Examiner*—Enrique L Santiago
(74) *Attorney, Agent, or Firm*—Wenderoth, Lind & Ponack, L.L.P.

(57) ABSTRACT

Two three-dimensional bodies using the computer graphics are shown on the screen in an overlapping manner. The two bodies may be located one in front of the other or one inserted into the other. The latter is called collision. The collision is detected by comparing a line segment extending in a depth direction of the first body, and a line segment extending in a depth direction of the second body. Both line segments are in alignment with a pixel of a projected image where the two bodies are overlapping.

4 Claims, 15 Drawing Sheets

Fig.2A
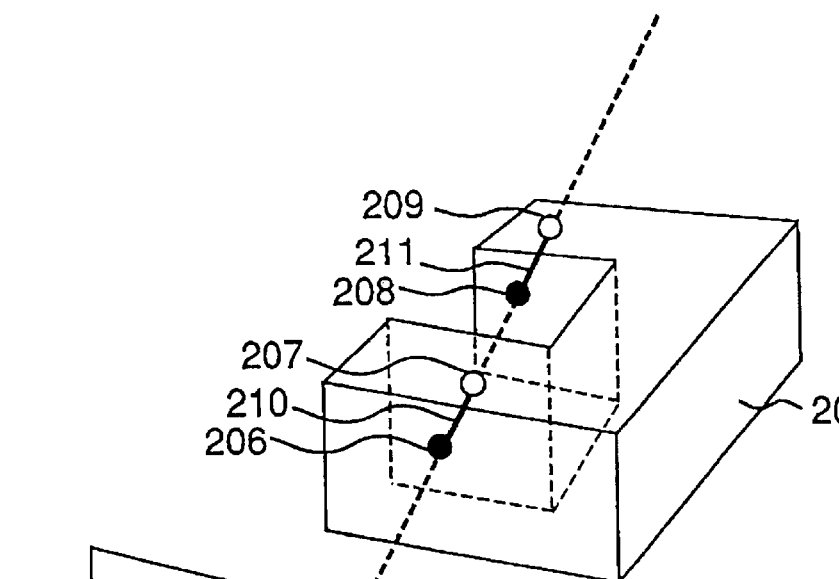
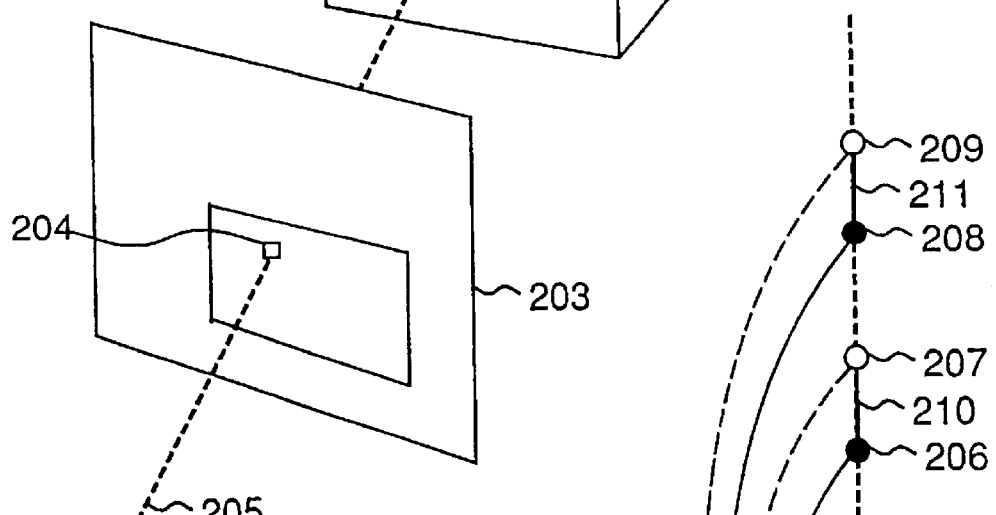
BACK DEPTH VALUE
FRONT DEPTH VALUE
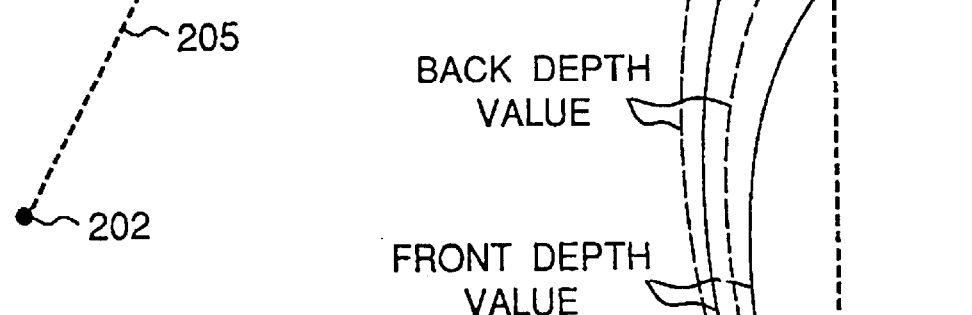
Fig.2B

*Fig.4A*
*Fig.4B*
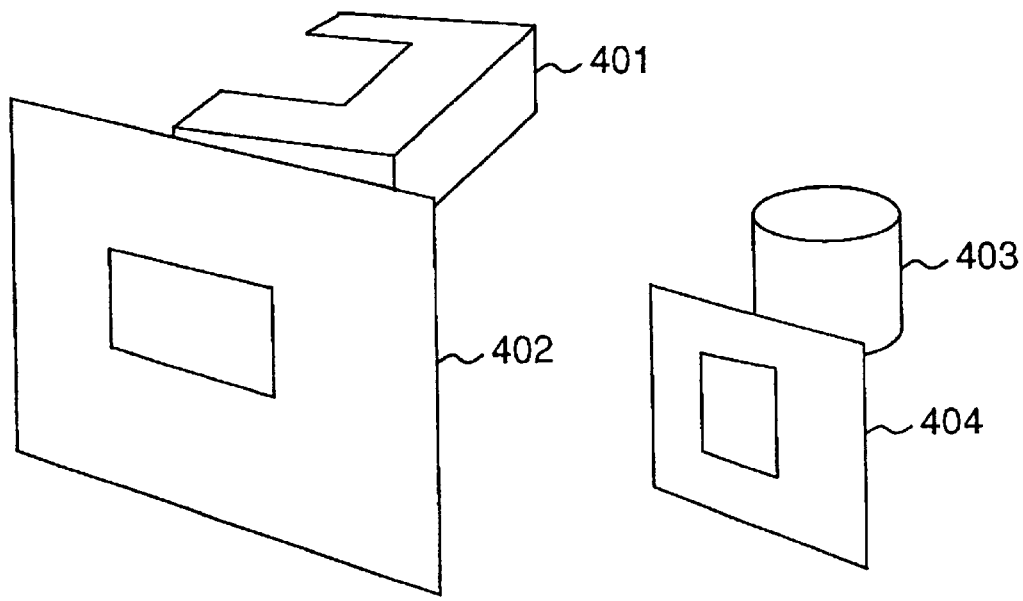
*Fig.4C*
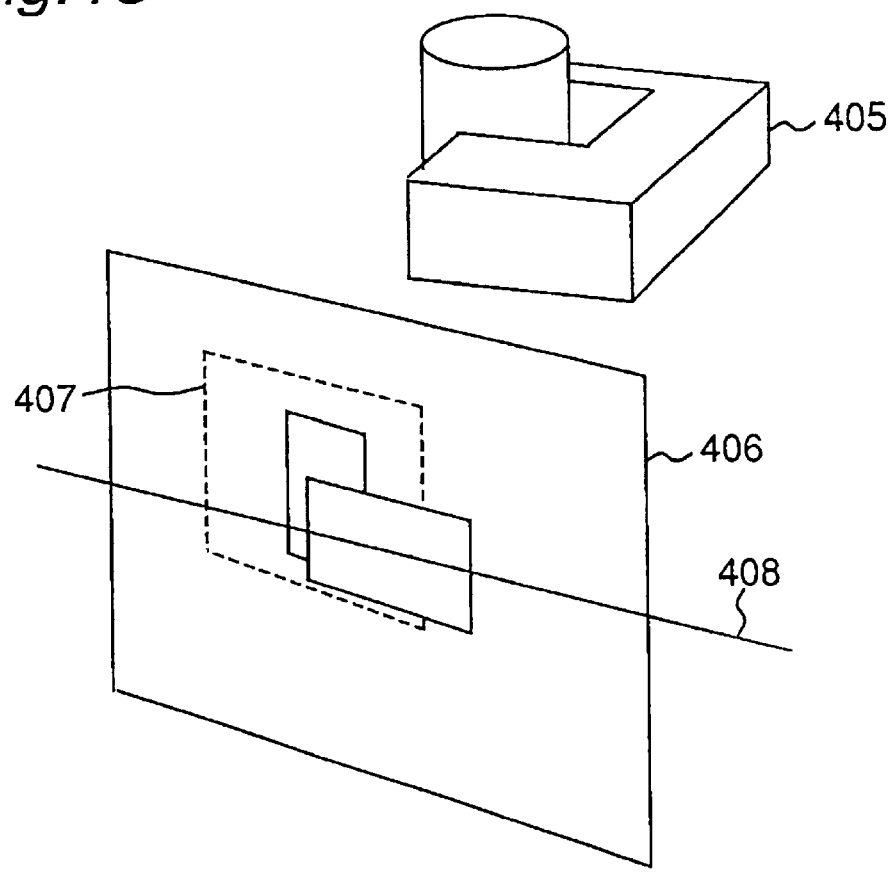

| Fig.6B | Fig.6C | Fig.6D | Fig.6E |
|---|---|---|---|
| EQ (8) < 0 | EQ (8) < 0 | EQ (8) < 0 | EQ (8) < 0 |
| EQ (9) > 0 | EQ (9) > 0 | EQ (9) > 0 | EQ (9) > 0 |

| Fig.6F | Fig.6G |
|---|---|
| EQ (8) > 0 | EQ (8) < 0 |
| EQ (9) > 0 | EQ (9) < 0 |

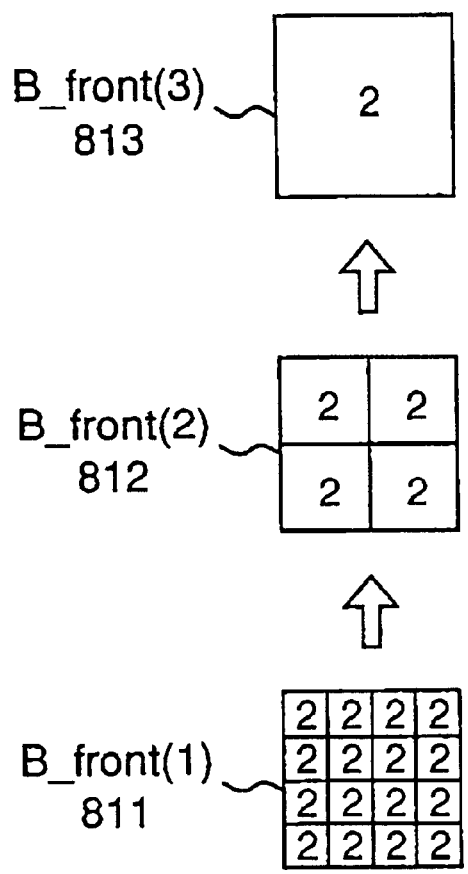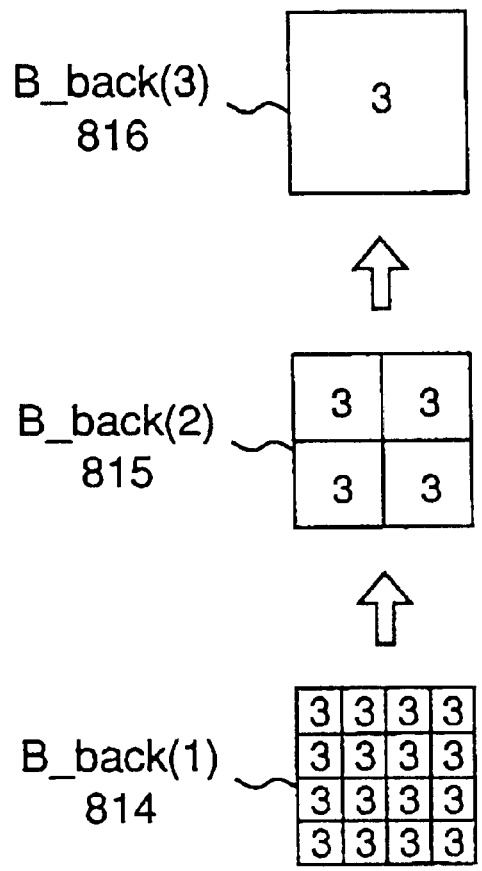

EQ (8)
(819)−(816)=4−3=1>0
(820)−(816)=1−3=−2<0
(821)−(816)=4−3=1>0

EQ (9)
(824)−(813)=11−2=9>0
(825)−(813)=14−2=12>0
(826)−(813)=11−2=9>0

METHOD AND DEVICE FOR COLLISION DETECTION AND RECORDING MEDIUM RECORDED WITH COLLISION DETECTION METHOD

BACKGROUND OF THE INVENTION

1. Field of the Invention

The present invention relates to collision detection for three-dimensional shapes used in computer graphics and the like and for images of the like that have depth and are obtained with range finders, stereoscopic vision, and the like.

2. Description of the Related Art

For some time, formats for collision detection have been used that employ geometric shapes with computer graphics, CAD, and the like as the format for the detection of contact and mutual interference between bodies and components. An explanation will be given regarding polygon model collision detection in which the three-dimensional shape of a body is approximated by small planes using computer graphics. To detect whether collisions have occurred among polygon models, the detection of collisions between each of the planes (polygons) is carried out for all polygon combinations.

Therefore, an explanation will be given using figures regarding a method for collision detection for two triangular polygons. FIG. 17A shows a state in which two triangular polygons 901 and 902 collide with each other, that is to say, overlap. In order to investigate the overlapping between the polygons, overlapping should be investigated between each line segment of the edges that constitute one of the triangles and the plane of the other triangle.

FIG. 17B shows the state in which one edge 903 of the triangular polygon 902 and the triangular polygon 901 overlap at point 904. Using parameter t, the equations of the straight line of the edge 903 in three-dimensional space can be expressed as $$x = x0 + it \qquad (1)$$

$$y = y0 + jt \qquad (2)$$

$$z = z0 + kt, \qquad (3)$$

where x0, y0, and z0 are coordinates of a point on the straight line; and i, j, and k are direction vectors of the straight line on the other hand, the equation of a plane on the triangular polygon 901 can be expressed as $$ax+by+cz+d=0, \qquad (4)$$

where a, b, and c are normal vectors to the surface, and d is the distance from the origin. Therefore, from Equation 1, Equation 2, Equation 3 and Equation 4, the parameter t of the straight line at the point of intersection 904 can be derived as $$t0=-(ax0+by0+cz0+d)/(ai+bj+ck). \qquad (5)$$

By means of the substitution of the t that has been derived in Equation 1, Equation 2 and Equation 3, it is possible to derive the coordinates of the point of intersection 904.

Actually, since the point of intersection is calculated only from the plane and straight-line parameters, it is necessary to next investigate whether the point of intersection is within the line segment 903 and the triangular polygon 901. With regard to whether the point of intersection 904 is within the line segment 903, if the parameters of the two end points 905 and 906 of the line segment 903 are made t1 and t2 (t1<t2) and the parameter t0 of the point of intersection in Equation 5 is $$t1 \leq t0 \qquad (6)$$

and $$t0 \leq t2, \qquad (7)$$

it can be detected that it is on (within) the line segment.

In addition, with regard to the detection as to whether the point 904 is inside the triangular polygon 901, as is shown in FIG. 17C, line segments are drawn from the point 904 to each of the apex points of the triangular polygon and, and if the total of the acute angles formed by the line segments is 360 degrees, it is detected that the point is inside. As is shown in FIG. 17D, in those cases where it is not 360 degrees, it is detected that the point is outside.

The above detection processing is carried out for the entire group of polygons constituting a model. By this means, two-polygon model collision detection is done.

However, the above-mentioned method has had a problem in that the processing time increases in proportion to the complexity of the three-dimensional shape. With the polygon model, as the shape becomes complex, the number of polygons with which detailed shapes are represented increases, and the number of comparison polygon combinations for the collision detection increases.

In particular, with regard to each of the pixels of an image measured with a range finder or the like, when the collision detection between range images (or depth images) at a given distance from the camera, or between the range images and the polygon models is considered, if the range images are thought of as being composed of rectangular polygons whose number is commensurate with the number of image pixels, collision detections for the combinations of polygons is required in an amount commensurate with the number of the pixels of the image. For example, let us assume that each pixel of a distant image is a rectangular polygon. In a worst-case scenario, an established collision involving a single triangular polygon of another body requires that the point of intersection in Equation 5 be calculated and the two magnitudes from Equations (6) and (7) for detecting the positions inside and outside of line segments be compared the number of times equal to the number of pixels, assuming that the number of sides is three. In addition, for the detection involving the interior of a rectangular polygon, it must be carried out the same number of times as the number of pixels for each of the four apex points.

A method may also be considered where a portion obtained by representing a range image as a plane rather than a polygon for each image is replaced with a large polygon, and the number of polygons is reduced. However, there is a problem in that this increases the processing for the polygon reduction.

In addition, collision detection must involve conversion to a polygon model when such detection involves solid models in which three-dimensional shapes rather than range images are represented as solid bodies whose interiors are filled with matter, as well as boxel models and various other models in which computer graphics other than meta-balls or other such polygon models are used. There has been a problem in that, with the increase of the conversion processing and the differences in the model representation methods, there is an extraordinary increase in the number of polygons with the polygon model for shapes that can be represented simply by other models. As an example of the latter problem, the globe is a fundamental shape for the meta-ball or the like, and can be simply described. However, with the polygon model, many polygons are required to describe a globe that has some degree of smoothness.

SUMMARY OF THE INVENTION

An object of the present invention is to allow the collision detection for bodies of complex shapes to be carried out with an amount of processing that is proportionate to the number of pixels of the projected image irrespective of the complexity of the body by carrying out collision detection in which arrays are correlated to each of the pixels of a projected image of a body without a collision detection of geometric shapes such as polygons.

In order to the attain the stated object, the present invention dispenses with the use of collision detection between polygons and entails instead performing collision detection that is independent of the complexity of the body shape by using body regions obtained by projecting bodies subject to collision detection onto the pixels of projected images, and by employing a depth array in which distances from an arbitrary point or plane are arranged for each of the pixels of th e projected images.

BRIEF DESCRIPTION OF THE DRAWINGS

FIG. 2A is an explanatory diagram depicting the relationships between the bodies, the projected images and the depth arrays;

FIG. 2B is a diagram showing the front depth value and the back depth value;

FIG. 4A is a diagram showing a U-shaped body and its projected image on the screen;

FIG. 4B is a diagram showing a column shaped body and its projected image on the screen;

FIG. 4C is a diagram of the manner in which two bodies collide and their projected image on the screen;

FIG. 11A is a diagram showing entered front depth values of the plate in the hierarchical depth arrays;

FIG. 11B is a diagram showing entered back depth values of the plate in the hierarchical depth arrays;

DETAILED DESCRIPTION OF THE PREFERRED EMBODIMENTS

Below, an explanation of the embodiments of the invention will be given using FIG. 1 through FIG. 16.

First Embodiment

Figure 1:
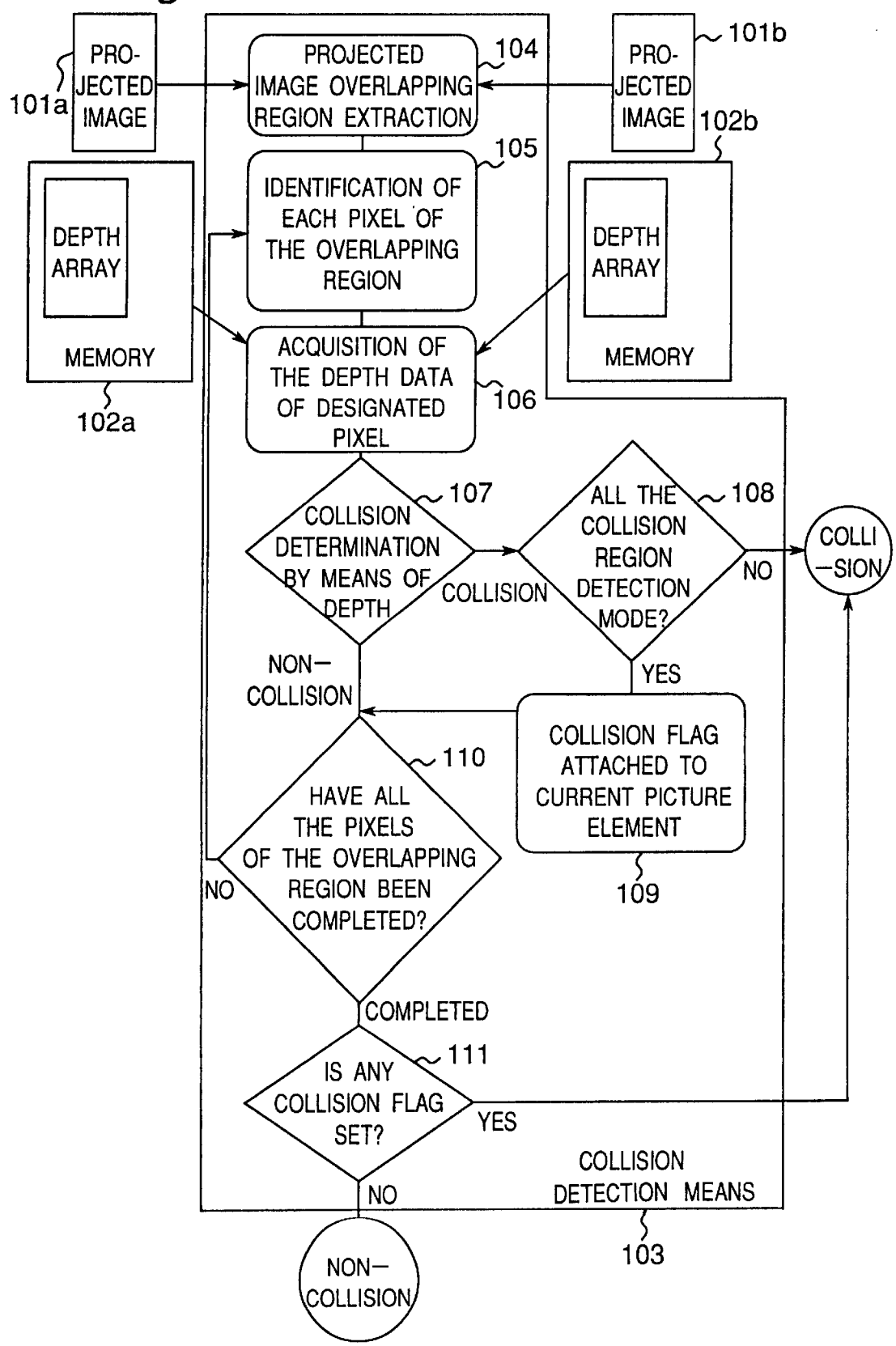
FIG. 1 is a diagram of the structure and the flow of the processing of the embodiments of the present invention.

FIG. 1 is a flow chart that shows an outline of the case where the collision detection processing of the present invention has been applied for two bodies. In FIG. 1, 101a and 101b are the projected images of two bodies viewed from the same viewpoint, 102a and 102b are the depth storage means, such as a memory, in which the depth arrays that are correlated to each of pixels of the projected images are stored, and 103 is the collision detection means in which the collision detection of the bodies is done from the projected images and the depth arrays. Here, the collision between two bodies A and B means, that a portion of body A is inserted into body B. The overlap between bodies A and B means, that, when viewing from a certain point, two bodies A and B are seen as overlapping either because body A is in front of body B, or vise versa, or because bodies A and B collide so that at least a portion of body A occupies the same space as a portion of body B.

In memory 102a, opposite end points of a line segment which extends through a body A in a viewing direction (depth direction) at a pixel point are stored. Similarly, in memory 102b, opposite end points of a line segment which extends through a body B in a viewing direction (depth direction) at a pixel point are stored.

In the collision detection means 103, the overlapping regions of the projected images are detected by step 104, and each of the pixels of the overlapping regions of the projected images is designated in order, one pixel at a time, by step 105. In step 106, the depths of the respective bodies for the pixels that have been designated are acquired. In step 107, the depths are used and a collision detection is carried out. In those cases where there has been a collision, a mode for the detection of all of the regions in which there is a collision and a mode for termination in the case where there has been a collision in even one location (these are set in advance by step 108) are used to terminate the processing if it has been detected that a collision has occurred in a mode in which the collision has occurred at a single location and has then stopped. In those cases where it is the mode for the detection of all the regions in which there is a collision, a flag indicating a collision is set by step 109, a flag that indicates that the current pixel is a collision region is set, and the operation proceeds to the next process. In step 110, in those cases where there are overlapping regions in which there are pixels that have not been processed, there is a return to step 105. In those cases where all of the processing has been completed, whether or not the collision flag has been set by step 109 is checked and, in those cases where the collision flag has been set, a detection of collision is output. In those cases where the flag has not been set, a detection of non-collision is output, and the collision detection processing terminates. In step 107, the depths are used and a collision detection is carried out. In those cases where there has been a collision, a mode for the detection of all of the regions in which there is a collision and a mode for termination in the case where there has been a collision in even one location (these are set in advance by step 108) are used to terminate the processing if it has been detected that a collision has occurred in a mode in which the collision has occurred at a single location and has then stopped. In those cases where it is the mode for the detection of all the regions in which there is a collision, a flag that indicating a collision is set by step 109, a flag that indicates that the current pixel is a collision region is set, and the operation proceeds to the next process. In step 110, in those cases where there are overlapping regions in which there are pixels that have not been processed, there is a return to step 105. In those cases where all of the processing has been completed, whether or not the collision flag has been set by step 109 is checked and, in those cases where the collision flag has been set, a detection of collision is output. In those cases where the flag has not been set, a detection of non-collision is output, and the collision detection processing terminates.

Next a detailed explanation will be given regarding the collision detection process.

FIG. 2A is a drawing that shows a relationship between a U-shaped body 201 and its image formed on a screen 203, and FIG. 2B is a diagram showing the front and back depth values. In FIG. 2A, the U-shaped body 201 is viewed from a viewpoint 202, and its image is projected on a screen 203.

The regions of the body that are correlated to one pixel 204 of the projected image 203 are line segments 210 and 211 resulting from the superposition of the body with a straight line 205 that passes through the viewpoint 202 and the pixel 204 in question. These line segments 210 and 211 are shown in FIG. 2B. Line segments 210 and 211 are the regions of the body that correlate to the pixel 204. The end points of the line segments are points on the surface of the body. The points 206 and 208 as shown in FIG. 2A are on the front surfaces of the body that face toward the viewpoint. As indicated in FIG. 2B, the distances between the viewpoint 202 and the point 206 and between the viewpoint 202 and 208 are the front depth values. In the same manner, points 207 and 209 are the back surfaces of the body that face in the direction opposite to the viewpoint 202. The distances between the viewpoint 202 and the point 207 and between the viewpoint 202 and the point 209 are the back depth values. These front depth values and back depth values are arranged for each of the pixels that correspond in the same manner to the projected images, yielding a depth array that describes the shape of the body.

A Z buffer for storing minimum depth values corresponding to each of the pixels of a synthetic image are often used when such back and front depth values are used to synthesize a three-dimensional shape into a two-dimensional image by computer graphics or the like. The values in the Z buffer correspond to the minimum front depth values. In the Z buffer, the values are updated with the minimum values, and the front and back depth values can be retrieved by expanding all the Z values of the body surface for storage purposes. In the case of a solid model or the like, it is possible to obtain the front and back depth values more directly from the model because of the availability of data concerning the interior of the body. The values can also be obtained with the aid of range image measurement systems that employ laser light, stereoscopic measurement systems using two cameras that have been arranged leaving an interval, and the like. A range image that holds the depth data for each pixel of the image can be viewed as a single array of minimum front depth values. In those cases where an actual reproduction of the scenery or the like is measured, the entire body is viewed as being filled from the front to the back, and the processing may be done by viewing it as one combined back and front depth array in which the back depth value is infinite. Or, by changing the direction 180 degrees and taking the measurements from two directions, it is possible to obtain the minimum front depth value and the maximum back depth value.

Figure 3:
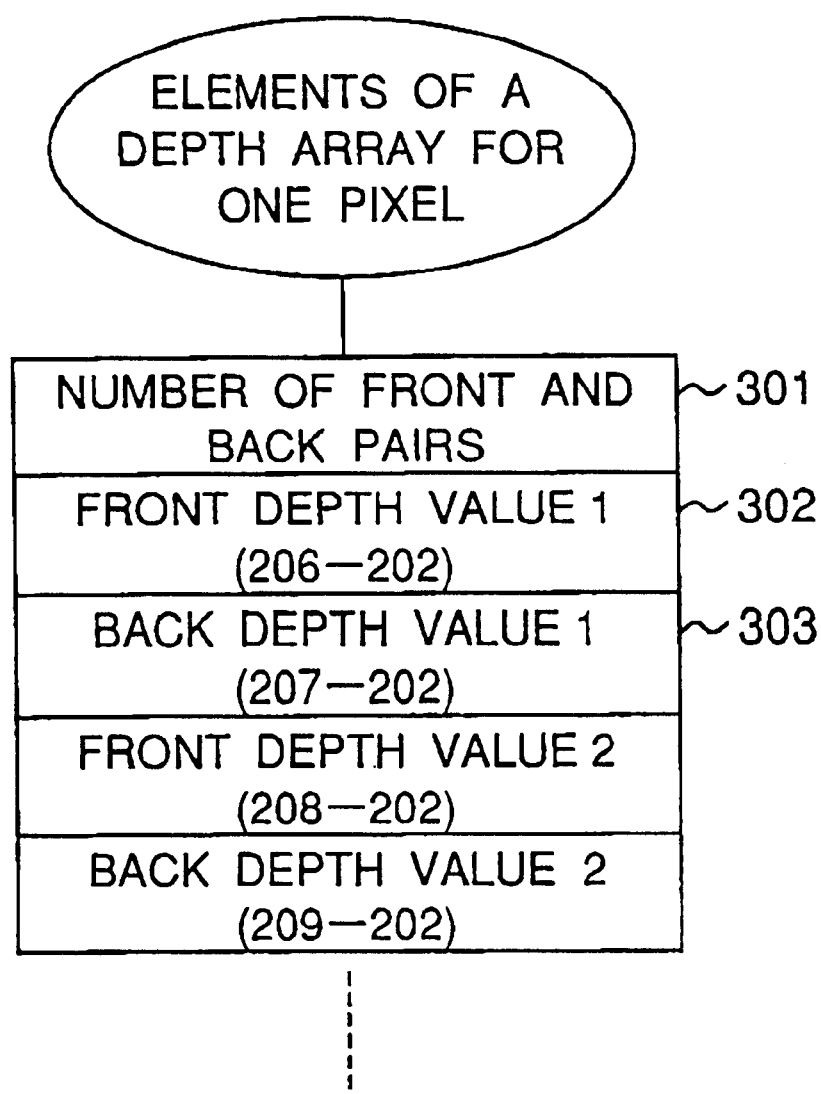
FIG. 3 is a diagram depicting the data structure of one element of a depth array.

FIG. 3 is a diagram that shows the data structure of an element of a depth array. 301 indicates the number of groups of back depth values and front depth values. This describes the extent of the irregularities of the body in the depth direction. One combination is involved if it is a simple body, and two groups are involved if it is a concave body, such as a U-shaped body as shown in FIG. 2A, that is divided into two regions in the depth directions. 302 is the initial front depth value, and 303 is the initial back depth value. Sorting should be performed in advance using small values in order to conform this alignment to the order of the straight line from the viewpoint 202 of FIG. 2A. If a group of front depth values and back depth values is thus processed in order from the beginning of the data, the result expresses the end points of the line segments of FIG. 2B that describe the regions of the interior of the body.

Next, the previously mentioned depth array will be used and an explanation will be given regarding the method of collision detection for each pixel. FIGS. 4A, 4B and 4C are diagrams for the explanation of the state established in three-dimensional space and the state achieved with the projected image in the case where a U-shaped body 401 and a cylindrical body 403 collide. In FIG. 4A, U-shaped body 401 and its projected image 402 are shown. In FIG. 4B, cylindrical body 403 and its projected image 404 are shown. In FIG. 4C, the two bodies 401 and 403 which are overlapping and colliding, and their projected image 406 are shown, provided that these bodies 401 and 403 are viewed from the same viewpoint. A composite image as shown in FIG. 4C can be made by the overlapping of the projected image 404 on the projected image 402. 407 indicates the region of the projected image 404 on 406. The overlapping region of the projected images in step 104 of FIG. 1 can be merely extracted as the region 407 in FIG. 4C, or masking can be performed solely for the regions occupied by the bodies on the projected images 402 and 404, and the regions can be extracted as smaller overlapping regions when these regions a lone are extracted.

Figure 5A:
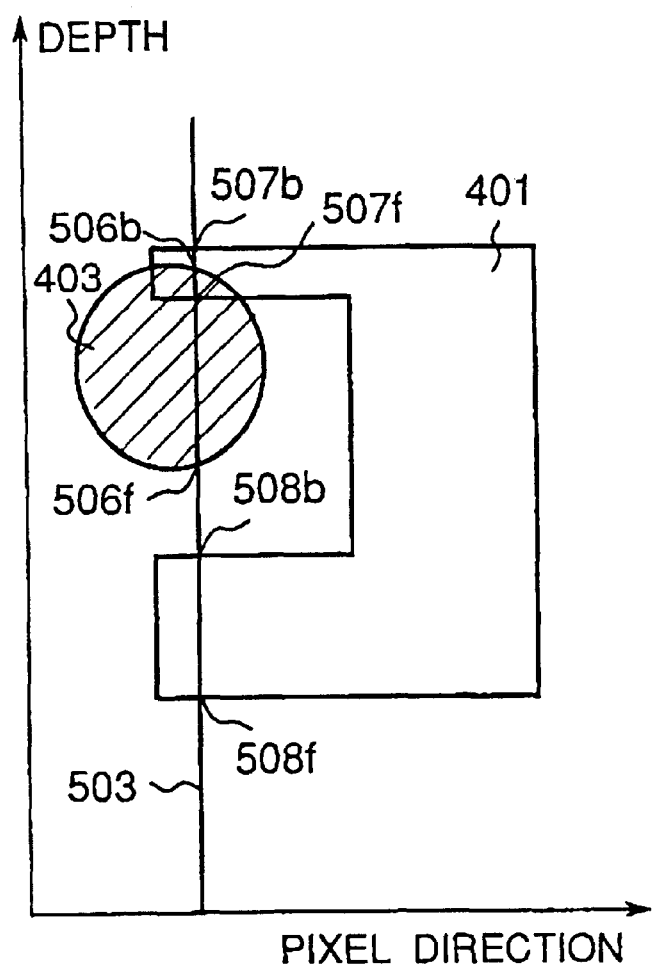
FIG. 5A is a diagram showing the collision of the two bodies viewed from top.

FIG. 5A shows a cross-sectional view taken along a line 408 in FIG. 4C to show the manner in which the two bodies 401 and 403 collide. In FIG. 5A, a line 503 extends in a depth direction from a particular pixel point on the screen.

Figure 5B:
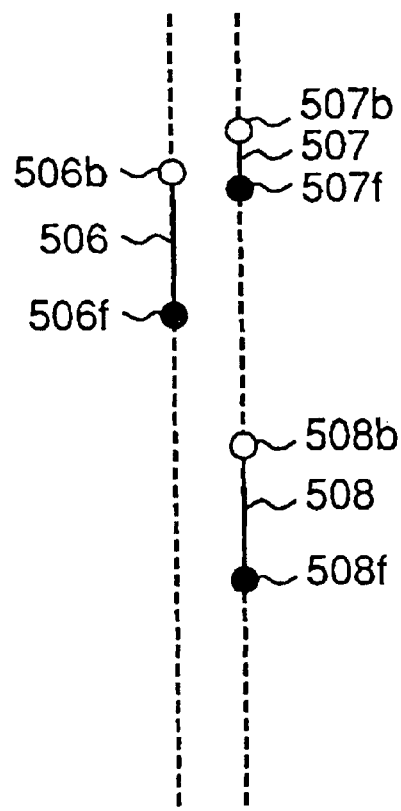
FIG. 5B is an explanatory diagram showing the depth of each body shown in FIG. 5A.

FIG. 5B shows the front depth value (black dot) and back depth value (white dot) of bodies 401 and 403 passing through line 503 in FIG. 5A. A line segment 506 is the region of the body 403 through which line 503 passes. A dot 506f represents a front depth value of the body 403 with respect to line segment 506, and a dot 506b represents a back depth value thereof. A line segment 507 is the region of the body 401 at a thin arm portion through which line 503 passes. A dot 507f represents a front depth value of the body 401 with respect to line segment 507, and a dot 507b represents a back depth value thereof. A line segment 508 is the region of the body 401 at a thick arm portion through which line 503 passes. A dot 508f represents a front depth value of the body 401 with respect to line segment 508, and a dot 508b represents a back depth value thereof.

The collision detection for each pixel of step 107 of FIG. 1 may be done by the inspection of the overlap of the regions that are shown by these line segments. The front depth values and back depth values are stored as elements of the depth array shown in FIG. 3.

Figure 6A:
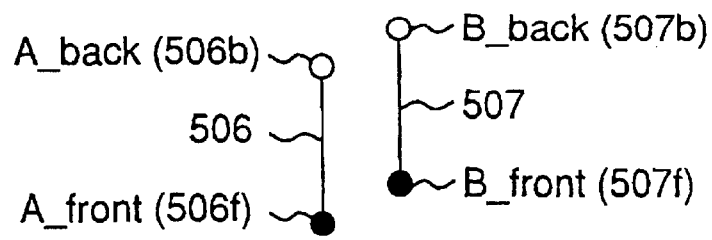
FIGS. 6A, 6B, 6C, 6D, 6E, 6F and 6G are explanatory diagrams showing the tests for detecting the collision of the bodies.
Figures 6B, 6C, 6D, 6E:
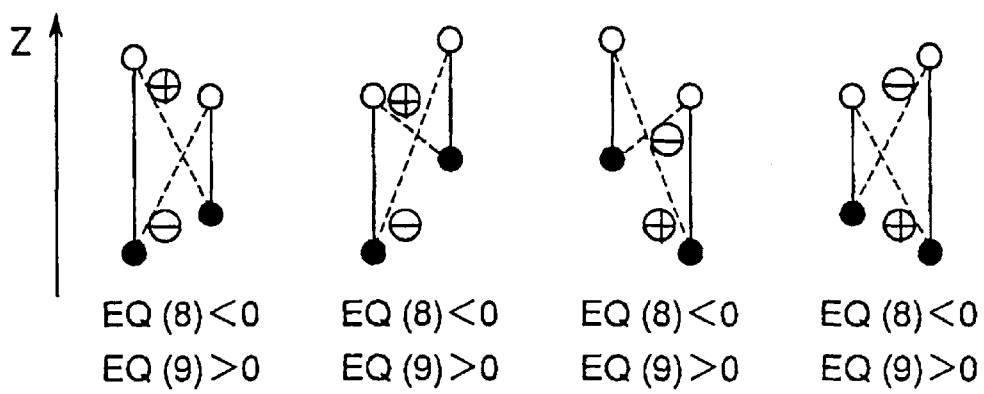
Figures 6F, 6G:
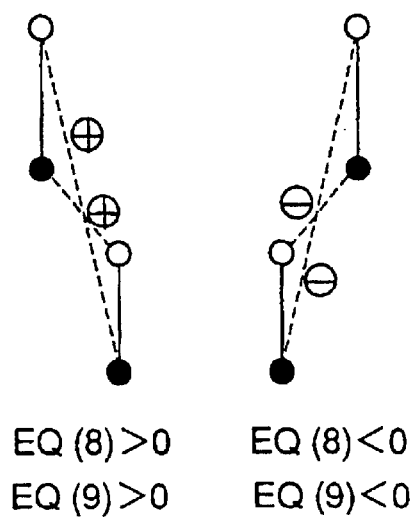

Next, an explanation Will be given regarding the inspection of the overlapping of the line segment 506 and the line segment 507. As is shown in FIG. 6A, for a body A, the front depth value (such as a value of the line segment 506 at a black dot) is designated as "A_front," and the back depth value (such as a value of the line segment 506 at a white dot) is designated as "A_back." In the same manner, for a body B, the front depth value (such as a value of the line segment 507 at a black dot) is designated as "B_front," and the back depth value (such as a value of the line segment 507 at a white dot) is designated as "B_back."

According to the present invention, a positivity or negativity sign (+ or −) of the following two formulas is considered.

$$A\_front - B\_back \quad (8)$$

$$A\_back - B\_front \quad (9)$$

When two bodies, such as bodies 403 and 401, collide, line segments 506 and 507 overlap. Four cases (FIGS. 6B, 6C, 6D and 6E) can be considered for the overlapping of the line segments 506 and 507. When line segments 506 and 507 overlap partly (FIGS. 6C and 6D), two bodies collide partly. When one line segment 506 (or 507) is completely covered by other line segment 507 (or 506) (FIGS. 6B and 6E), one body is completely inserted in the other body. In any of the cases shown in FIGS. 6B, 6C, 6D and 6E, the calculated result of equation (8) has a negative value, and the calculated result of equation (9) has a positive value. In other words, whenever the collision takes place between two bodies, the signs of the calculated results of equations (8) and (9) differ.

On the other hand, when two bodies, such as bodies 403 and 401, do not collide, line segments 506 and 507 do not overlap. Two cases (FIGS. 6F and 6G) can be considered for the non-overlapping of the line segments 506 and 507. In any of the cases shown in FIGS. 6F and 6G, the calculated results of equations (8) and (9) have the same sign, either a positive sign or a negative sign. In other words, whenever the collision does not take place between two bodies, the signs of the calculated results of equations (8) and (9) are the same.

If the positive sign is expressed by "1" and the negative sign is expressed by "0", an EXCLUSIVE OR taken between the signs of the calculated results of equations (8) and (9) will be "0" when the signs are both pluses (+, +) or both minuses (−, −) or will be "1" when the signs are plus and minus (+, −) or minus and plus (−, +).

The case where the value of equation (8) or equation (9) is 0 is a case where there is a contact between two bodies, and this can be included in a collision. Therefore, a collision detection can be made for a group of line segments by performing two subtractions, two positive and negative detections, and one EXCLUSIVE-OR operation.

To detect the collision between two bodies, the overlap between two line segments, such as line segments 506 and 507, is detected. In the above description the detection of overlap between two line segments is carried out by using equations (8) and (9). But instead of using equations (8) and (9), the overlap between two line segments can be detected by using the following two equations (10) and (11).

$$A\_front < B\_back \quad (10)$$

$$A\_back > B\_front \quad (11)$$

When the two equations (10) and (11) are satisfied, two line segments overlap, and therefore, two bodies collide.

For example, in the cases of FIGS. 6B, 6C, 6D and 6E, both equations (10) and (11) are satisfied to obtain the collision detection. But in the cases of FIGS. 6F and 6G, only one of the two equations (10) and (11) is satisfied, and therefore, the collision is not detected. In equation (10) or (11), if $$A\_front = B\_back, \text{ or}$$

$$A\_back = B\_front$$

is obtained, two objects contact at either end of the line segment. Thus, such a case is included as one style of collision. It is possible that the contact is not included in the collision. Therefore, in this case, with respect to the two line segments, two comparisons and one logic AND are carried out to detect the collision.

If at least one collision detection is obtained for one pixel, it is possible to detect a collision between two bodies. Furthermore, if the above detection is carried out for all of the pixels in the overlapping area, the portion of the two bodies where the collision is taking place can be detected precisely.

The software program for this kind of FIG. 1 processing can be written to recording media and distributed in the market. The same is true for the aspect of the embodiment below.

Second Embodiment

With the previously mentioned collision detection, in a case where bodies have not collided, the detection is not output until detections have been made for all of the pixels of the overlapping region, and the amount of processing increases with an increase in the overlapping region. An explanation will be given below regarding a method in which a detection is made before all the pixels are processed when there is no collision and the elements are completely separated (their irregularities are not combined).

Figure 7:
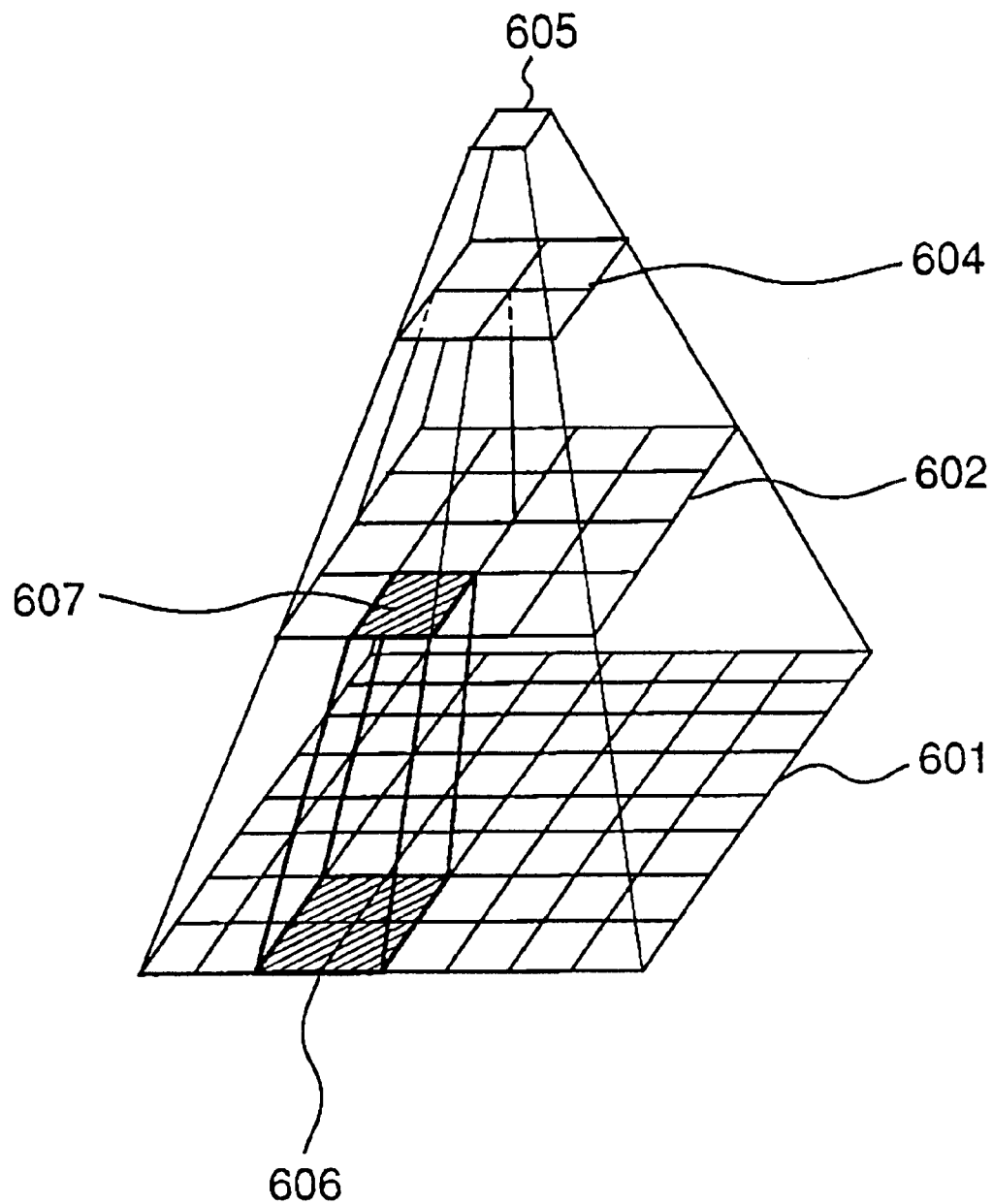
FIG. 7 is a diagram showing the hierarchical arrangement of the depth arrays used in the second embodiment of the invention.

FIG. 7 is an explanatory diagram of the minimum depth value hierarchy of a depth array. The minimum value of the depth array is the front depth value 1 according to 302 in FIG. 3 (initial element of the depth array) and is the same value as the range image, which is the distance up to the body region that is seen in the projected image. This holds true for any pixel of a body having an arbitrary shape. 601 in FIG. 7 indicates a case in which the minimum depth alone is thus arranged. 602 is obtained by integrating a plurality of such pixels 601 into a smaller array. By doing the same integration in order, the arrays 604 and 605 are configured hierarchically. In the case of this figure, 605 is finally integrated as the minimum depth value of the pixel of the entire image. An explanation will be given next of the method for integrating up to the top level. The region 606, which is composed of four pixels of the level 601, corresponds to the pixel 607 of the level 602. The value of 607 is constituted so as to be the minimum value of the minimum depth values of the region 606. After this, in the same manner, the upper levels are assigned the minimum value of the corresponding region in the level below. Therefore, the pixel that is the only one in the uppermost level 605 comes to represent the minimum depth value for the entire body. In other words, each level forms a circumscribed shape for the front of the body at different resolutions.

In the same manner, the maximum depth values of the depth array are made into a hierarchy. The maximum values of the depth array for each pixel become the final elements of the data of FIG. 3, and this value also exists without exception no matter what kind of case. When maximum depth values are made into a hierarchical arrangement, the top level is constituted as a value which is the maximum value of the region that corresponds to the opposite of the previously mentioned minimum depth hierarchy. Each of the levels forms a circumscribed shape of the back.

By means of a comparison from the uppermost levels of these two maximum and minimum depth hierarchies, it is possible to carry out fewer operations when no collisions occur among separated bodies. For example, if the bodies are completely separated, all of the maximum depth values of the body that is in front will be values that are smaller than any of the minimum depth values of the body that is in the rear. Therefore, if a comparison is made between the hierarchies with which the entire image has been integrated, such as 605 of FIG. 7, it is possible to make a detection of non-collision with one comparison.

Figure 8:
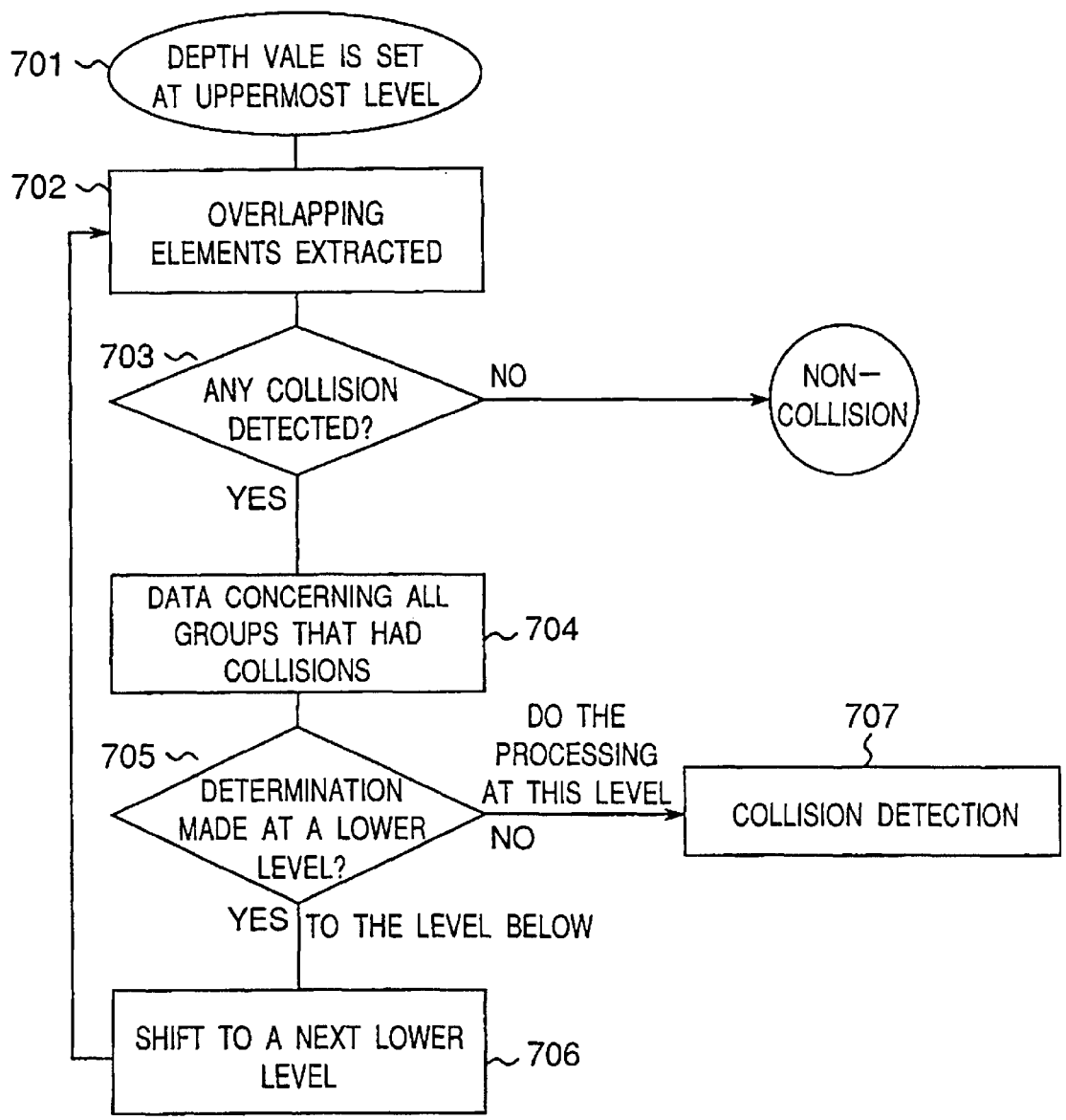
FIG. 8 is a flow chart of collision detection using the hierarchical depth arrays.

An explanation of the collision detection processing flow that em ploys hierarchical depth arrays will be given using the figures. FIG. 8 is a flow-chart of the processing, and FIGS. 9A to 16B are explanatory diagrams of simple examples of depth Arrays and the flow of processing.

Figure 9A:
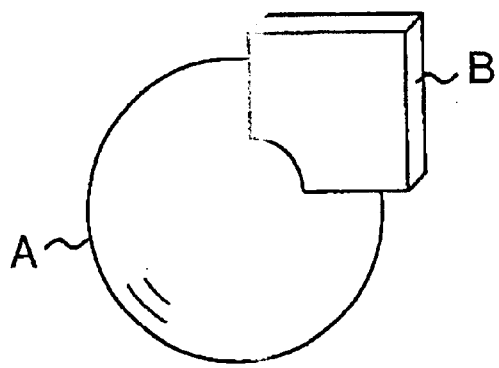
FIG. 9A is a perspective view of a ball and a plate colliding.
Figure 9B:
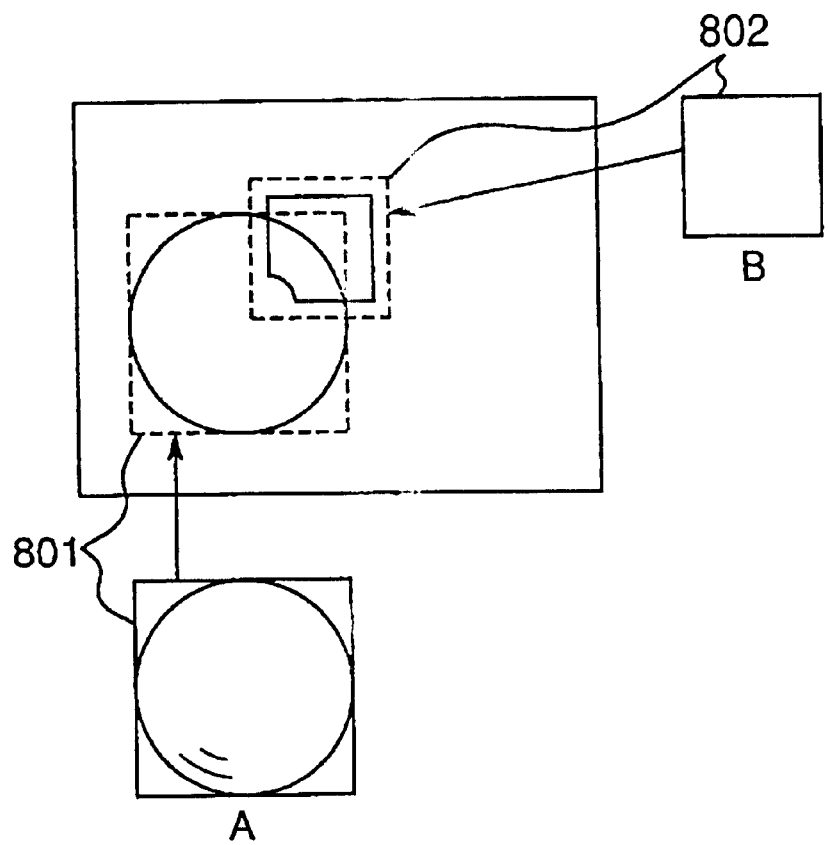
FIG. 9B is a diagram showing the screen view of the two bodies shown in FIG. 9A.

FIG. 9A is a schematic diagram that shows the state in which a sphere and a rectangular plate have collided. FIG. 9B shows projected images thereof. 801 is the projected image of the sphere, and 802 is the projected image of the plate. The sphere and the plate are separately converted into projected images and are overlapped.

Figure 10A:
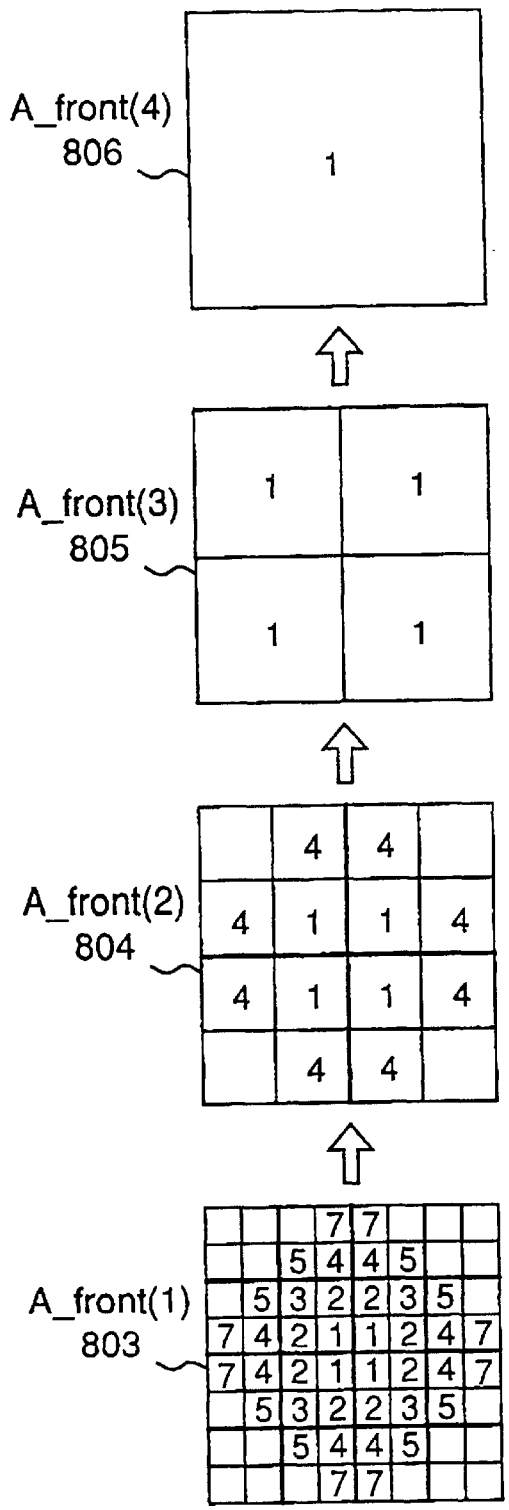
FIG. 10A is a diagram showing entered front depth values of the ball in the hierarchical depth arrays.

In FIG. 10A, the hierarchical depth maps that correspond to the projected image 801 of the sphere are shown. 803 is an 8×8 front depth array that corresponds to the original projected image. The figures in each of the square frames that represent the array elements express the depth values. For the elements for which there is no corresponding projected image of a body, a special flag is set that indicates that there is no body image. For this kind of element, no figures are written, and the spaces are left blank. The adjoining 2×2 regions of 803 that are indicated by the heavy lines are integrated and made into a 4×4 array, producing the front hierarchical depth array 804 one level up. Each of the elements of 804 have values that are the minimum values of the four depth values of the corresponding region of 803. Therefore, a depth value that is smaller than this minimum value will be smaller than the four elements of the corresponding region of 803. The blank elements that do not have a projected image are not referred to in the calculation of the minimum value and, in those cases where all of the four elements are blank, the element in the rank above is also blank. In the same manner, 805 is a 2×2 depth array that has the minimum value of the 2×2 regions of 804, and becomes a front hierarchical depth array two levels above. In the same manner, 806 is the integration of 805 and, in this case, is the highest-level front hierarchical depth array. The value of the element in this array is the minimum value of the front depth values of the sphere.

Figure 10B:
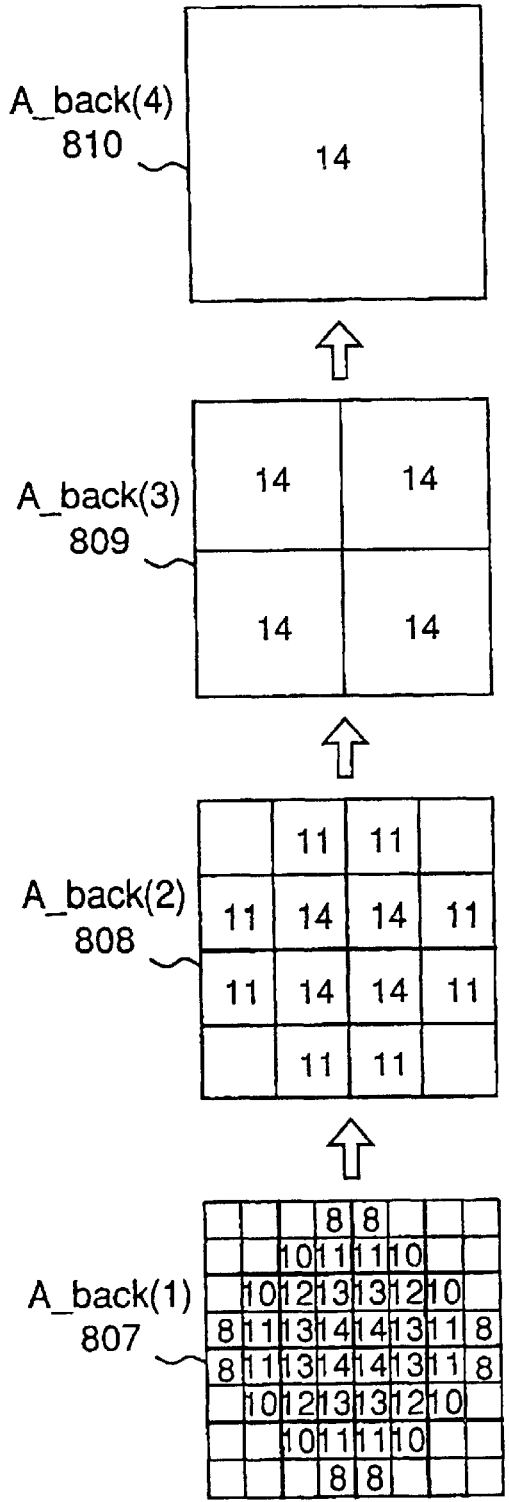
FIG. 10B is a diagram showing entered back depth values of the ball in the hierarchical depth arrays.

As shown in FIG. 10B, in the same manner, array elements 808, 809 and 810 are obtained by forming a hierarchy from the back depth array 807 of the projected image 801 of the sphere. In the case of the rear depth array, the maximum value of the corresponding 2×2 region is designated as an element of the array one level above. The value 14 of the uppermost back hierarchical depth array 810 is the maximum value of the depth values of the sphere. All the depth values of the sphere therefore lie between the value of 1 in 806 and the value of 14 in 810. The top ranking depth levels encircle the actual shape and describe a larger circumscribed form.

In FIG. 11A, the hierarchical depth arrays that correspond to the depth values of the projected image 802 of the plate are shown. 811 is a 4×4 front depth array of the projected image 802, and 812 is the next highest level of the front hierarchical depth array obtained by integrating 2×2 regions with minimum values. 813 is the front hierarchical depth array one further level above and is the uppermost rank.

In FIG. 11B in the same manner, 814 is the back depth array of tho projected image 802, and 815 and 816 are back depth arrays obtained by configuring this into a sequential hierarchy.

Figure 12A:
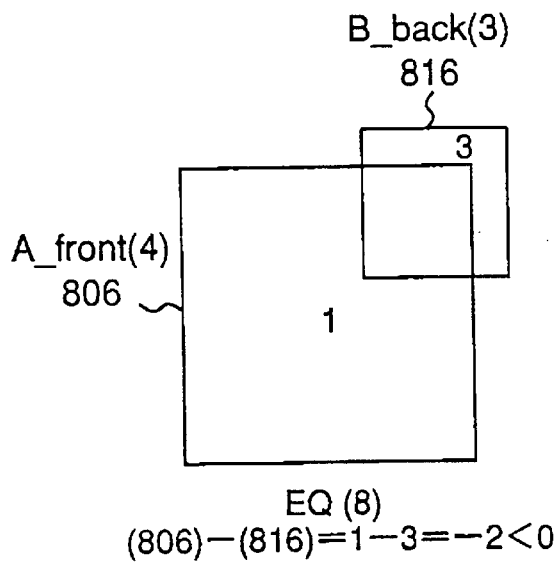
FIGS. 12A, 12B, 13A, 13B, 14A, 14B, 15A, 15B, 16A and 16B are diagrams each showing the comparison between a depth layer of the ball and a depth layer of the plate.
Figure 12B:
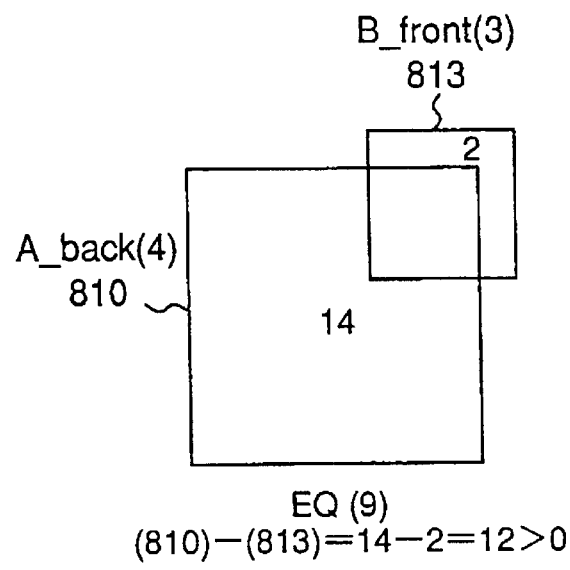

A description will now be given concerning a procedure for detecting collisions using the hierarchical depth arrays in FIGS. 10A, 10B, 11A and 11B. First of all, as is shown in 701 of FIG. 8, the processing is begun from the uppermost level. FIG. 12A shows the condition in which the uppermost sphere front level 806 and plate back level 816 are overlapped, and FIG. 12B shows the condition in which the uppermost sphere back level 810 and plate front level 813 are overlapped. In the next process 702, groups of pixels of the portions where overlapping is produced by the projected images are extracted with the elements (pixels) that are contained in those levels. In the case of FIGS. 12A and 12B, there is only one corresponding region each and, thus, there is no more than one group for the overlapping region. Next, in process 703, a detection of collision is made for the elements of this group, and the signs of the difference between the front depth and the back depth of Equations (8) and (9) are detected. In this case, Equation (8) is negative (806)−(816)=1−3=−2 while Equation (9) is positive.

(810)−(813)=14−2=12

Because the signs are different, there is a possibility that a collision has occurred. Actually, even if there is a collision in the upper levels, if the regions of the lower levels are divided finely, there will also be cases where there is no collision. Conversely, if no collision has occurred in the circumscribed shape encircled by the maximum and minimum values in the absence of a collision, no collision will be detected even if a division of the shape that is finer than that is done. Processing can therefore be terminated at this stage, if no collision is detected at 703. By this means, it is possible to design for a higher processing speed in a non-collision case.

Next, in the case of a collision, all of the groups that have a collision are extracted in process 704, and a detection is made whether to move the processing for these groups to the lower levels by process 705. For example, the processing may be carried out by comparing each pixel in process 707 if the next Level is the lowest level of an element in a pixel, as shown by 803 and 807 in FIGS. 10A and 10B and by 811 and 841 in FIGS. 11A and 11B. Or, the hierarchical processing is aborted if the area of the overlapping region of one of the bodies is smaller than a set threshold value, and less processing is involved in comparing the pixels in 707 than in performing division to a lower level.

Figure 13A:
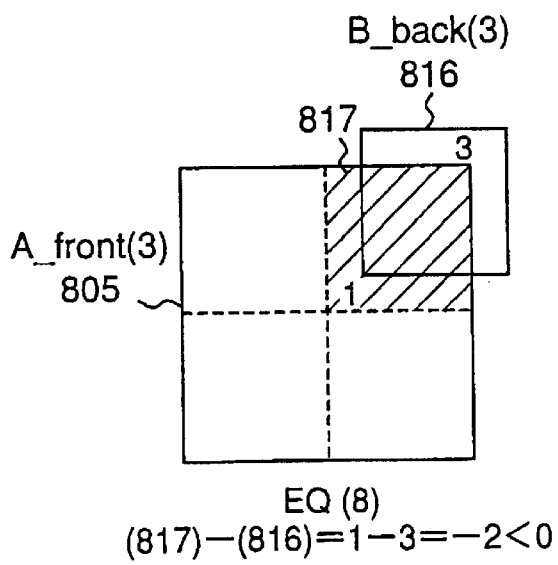
Figure 13B:
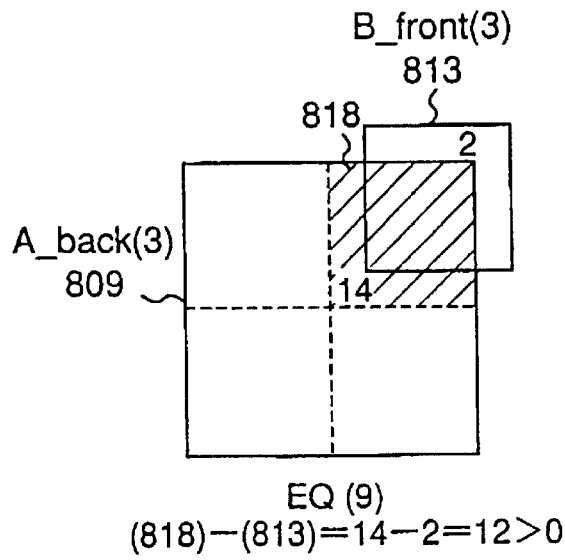

To continue processing at a lower level, larger surface areas of regions corresponding to the initially lowermost level are replaced with regions corresponding to the next lowest level from among the corresponding elements in process 706. Because the area of the elements of the sphere that correspond to 806 and 810 in FIG. 10B is larger, 806 and 810 are replaced by 805 and 809 of the next lowest. This situation is shown in FIGS. 13A and 13B. After the replacement, the same processing is repeated from process 702. In FIGS. 13A and 13B, the overlapping regions are only the elements 817 and 818 in the upper right of 805 and 809, so the Equations (8) and (9) collision detection is carried out with 817 and 816 and with 818 and 813. In this case also, each difference has a different sign and a collision is possible, so a further detection is carried out at a lower level.

Figure 14A:
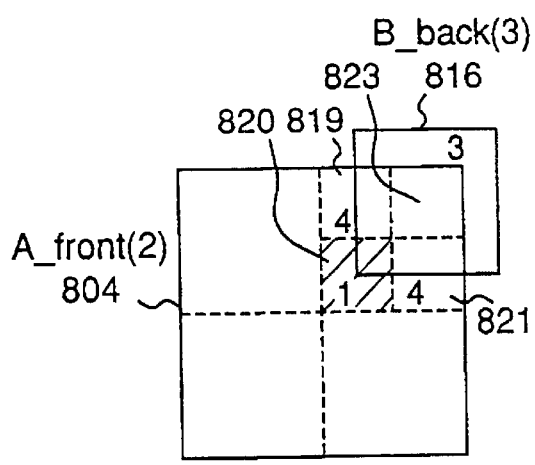
Figure 14B:
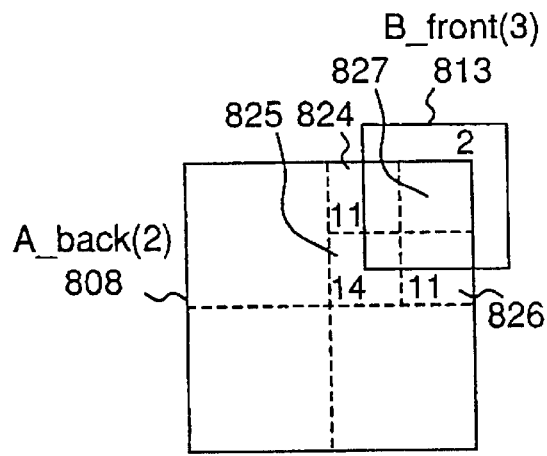

In 706, the areas of the corresponding groups 805 and 809 as well as 817 and 818 are equal, so the division may be done with any of them, and the 805 and 817 depth arrays of the sphere are further divided into the lower level arrays 804 and 808. In FIGS. 14A and 14B, the overlapping condition following division is shown. 805 is divided into the four regions 819, 820, 821 and 823, and 817 is divided into 824, 825, 826 and 827. Because 823 and 827 are blank regions with no projected images, the extraction of overlapping groups of 702 is omitted. Therefore, the Equations (8) and (9) collision detection is carried out with the three overlapping groups. For groups 819 and 824, the same sign is obtained, and no collisions are observed.

For Equation (8) (819)−(816)=4−3=1

For Equation (9) (824)−(813)=11−2=9

With groups 820 and 825, the signs differ, and collisions are possible.

For Equation (8) (820)−(816)=1−3=−2

For Equation (9) (825)−(813)=14−2=12

With groups 821 and 826, the signs are the same, and there are no collisions.

For Equation (8) (821)−(816)=4−3=1

For Equation (9) (826)−(813)=11−2=9

Figure 15A:
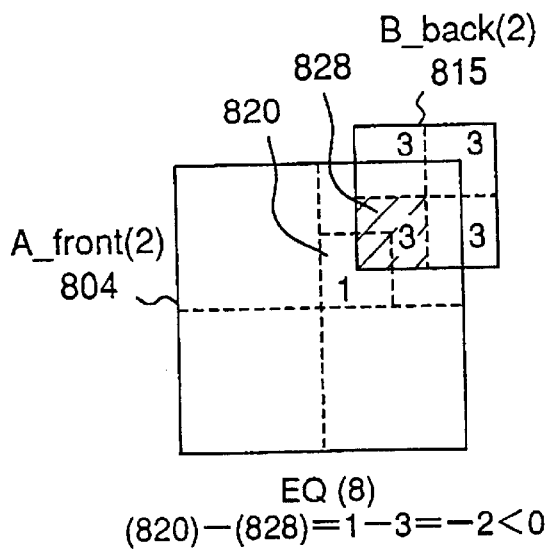
Figure 15B:
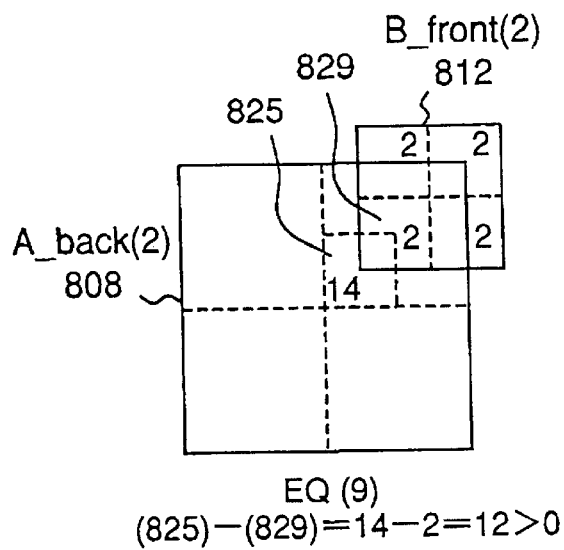

Therefore, lower level collision detection is carried out with the single groups of 820 and 816 as well as 825 and 813. The condition in which 816 and 813 have been divided into the corresponding regions of the lower ranking levels 804 and 808 in 706 is shown in FIGS. 15A and 15B. The overlapping group is one that corresponds to 820 and 828 or 825 and 829 and, when the Equations (8) and (9) signs are inspected, it can be seen that these signs are different and that there is a possibility of a collision.

Figure 16A:
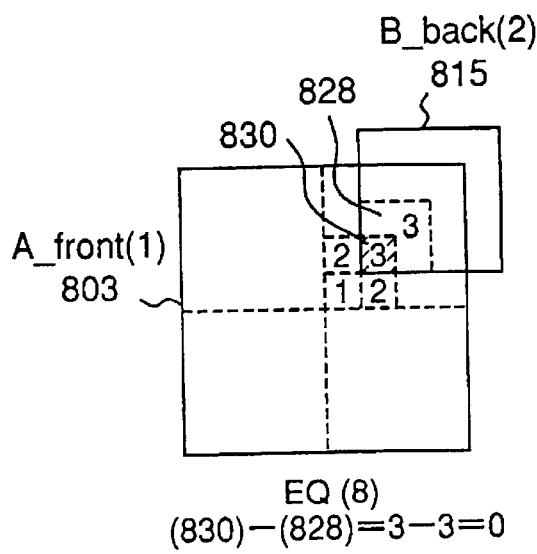
Figure 16B:
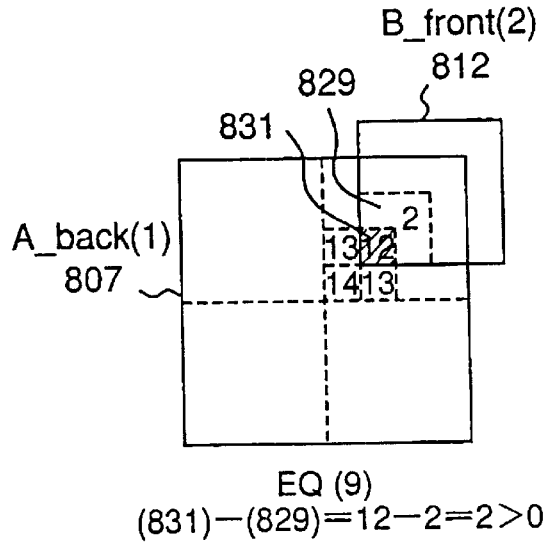
Figure 17A:
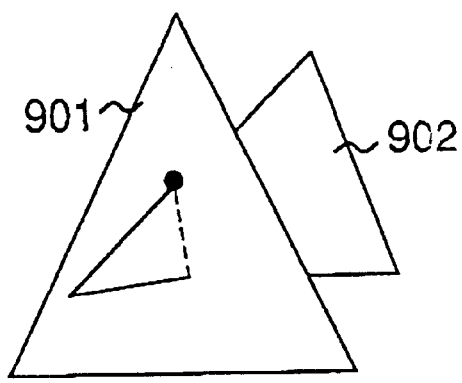
FIGS. 17A, 17B, 17C and 17D are diagrams of a conventional collision detection with polygons.
Figure 17B:
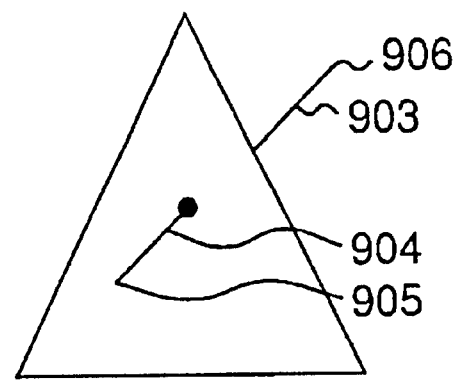
Figure 17C:
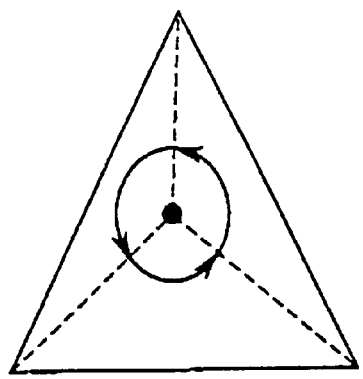
Figure 17D:
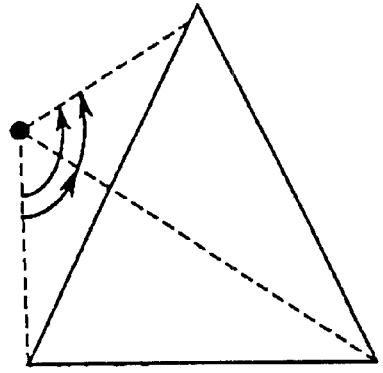

Therefore, 820 and 825 are further divided to lower levels 803 and 807. This condition is shown in FIGS. 16A and 16B. The overlapping regions that have been derived in 702 are 830 and 831, and different signs are obtained and a collision is detected when such collision detection is performed using Equations (8) and (9) and the plate regions 815 and 812. 803 and 807 are depth arrays that correspond to a pixel of an original element and because the collision region has been derived corresponding to an element, the detection of a collision between the pixels of 707 is completed and the processing terminated.

Thus, the present invention allows collision detection to be performed by a routine that is proportionate to the number of pixels in a projected image without the increase in the volume of processing due to the complexity of the geometric shapes, as is the case with the detection of collisions among polygons. In addition, the pixels of a projected image can be processed at a higher speed due to shared processing, which is achieved by employing a routine that is largely similar to the image composite processing performed using the Z buffer of computer graphics or the like, and by incorporating collision detection into the composite processing of images.

Also, in the case where there are some movements in the scene expressed by forming a plurality of frames and synthesizing moving objects, many frames can be prepared without any collision occurring between the objects. In such a case, by the use of hierarchical depth maps as described in the second embodiment, the detection of the collision can be done in a very short time. Thus, the collision detection of one frame can be done in a very short time.

What is claimed is:

1. A collision detection device for detecting a collision between first and second bodies displayed on a screen, comprising:

a first memory for storing first and second end positions of a first line segment as a front depth data A_front and a back depth data A_back, respectively, the first line segment extending in a depth direction of the first body, and being in alignment with a pixel of a projected image;

a second memory for storing first and second end positions of a second line segment as a front depth data B_front and a back depth data B_back, respectively, the second line segment extending in a depth direction of the second body, and being in alignment with the pixel;

a reading arrangement for reading the first and second end positions of the first line segment and the first and second end positions of the second line segment;

a line overlap detector for detecting whether said first and second line segments are at least partially overlapping using said depth data A_front, A_back, B_front and B_back; and a collision detector for detecting a collision of the first and second bodies when the fit and second line segments are overlapping, wherein said line overlap detector is operable to calculate a first equation A_front−B_back and a second equation A_back−B_front, and wherein said line overlap detector is operable to detect a line overlap when the signs of the calculated results of the first equation and the second equation are not the same.

2. A collision detection device for detecting a collision between first and second bodies displayed on a screen, comprising;

a first memory for storing first and second end positions of a first line segment as a front depth data A_front and a back depth data A_back, respectively, the first line segment extending in a depth direction of the first body, and being in alignment with a pixel of a projected image;

a second memory for storing first and second end positions of a second line segment as a front depth data B_front and a back depth data B_back, respectively, the second line segment extending in a depth direction of the second body, and being in alignment with the pixel, a reading arrangement for reading the first and second end positions of the first line segment and the first and second end positions of the second line segment;

a line overlap detector for detecting whether said first and second line segments are at least partially overlapping using said depth data A_front, A_back, B_front and B_back; and a collision detector for detecting a collision of the first and second bodies when the first and second line segments are overlapping, wherein said line overlap detector is operable to determine whether a first condition A_front <B_back is satisfied and whether a second condition A_back>B_front is satisfied, and wherein said line overlap detector is operable to detect a line overlap when the first condition and the second condition are satisfied.

3. A collision detection method for detecting a collision between first and second bodies displayed on a screen, comprising:

storing first and second end positions of a first line segment as a front depth data A_front and a back depth data A_back, respectively, the first line segment extending in a depth direction of the first body, and being in alignment with a pixel of a projected image;

storing first and second end positions of a second line segment as a front depth data B_front and a back depth data B_back, respectively, the second line segment extending in a depth direction of the second body, and being in alignment with said pixel;

reading the first and second end positions of the first line segment and the first and second end positions of the second line segment;

detecting whether the first and second line segments are at least partially overlapping using the depth data A_front, A_back, B_front and B_back; and detecting a collision of the first and second bodies when the first and second line segments are overlapping, wherein said detecting whether the first and second line segments are at least partially overlapping farther comprises calculating a first equation A_front−B_back and a second equation A_back−B_front, and and wherein a line overlap is detected when the signs of the calculated results of the first equation and the second equation are not the same.

4. A collision detection method for detecting a collision between first and second bodies displayed on a screen, comprising:

storing first and second end positions of a first line segment as a front depth data A_front and a back depth data A_back respectively, the first line segment extending in a depth direction of the first body, and being in alignment with a pixel of a projected image;

storing first and second end positions of a second line segment as a front depth data B_front and a back depth data B_back, respectively, the second line segment extending in a depth direction of the second body, and being in alignment with said pixel;

reading the first and second end positions of the first line segment and the first and second end positions of the second line segment;

detecting whether the first and second line segments are at least partially overlapping using the depth data A_front, A_back, B_front and B_back; and detecting a collision of the first and second bodies when the first and second line segments are overlapping, wherein said detecting whether the first and second line segments are at least partially overlapping further comprises determining whether a first condition A_front<B_back is satisfied and whether a second condition A_back>B_front is satisfied, and wherein the first and second line segments are detected to be at least partially overlapping when the first condition and the second condition are satisfied.

* * * * *

UNITED STATES PATENT AND TRADEMARK OFFICE
CERTIFICATE OF CORRECTION

PATENT NO.    : 6,518,966 B1
DATED         : February 11, 2003
INVENTOR(S)   : Masamichi Nakagawa It is certified that error appears in the above-identified patent and that said Letters Patent is hereby corrected as shown below:

Title page,
Item [73], Assignee, "Matsushita Institute Industrial Co., Ltd., Osaka (JP)" should read -- Matsushita Electric Industrial Co., Ltd., Osaka (JP) --.
Item [30], "(JP) 10-060047" should read -- (JP) 10-60047 --.

Column 12,
Line 30, delete "fit" and insert -- first --.
Line 40, delete ";" and insert -- : --.
Line 52, delete "," and insert -- ; --.

Signed and Sealed this

Twentieth Day of January, 2004

JON W. DUDAS
*Acting Director of the United States Patent and Trademark Office*